US007844762B2

(12) United States Patent
Banks et al.

(10) Patent No.: US 7,844,762 B2
(45) Date of Patent: Nov. 30, 2010

(54) PARALLEL INTERFACE BUS TO COMMUNICATE VIDEO DATA ENCODED FOR SERIAL DATA LINKS

(75) Inventors: John D. Banks, Cupertino, CA (US); Paul D. Wolf, San Carlos, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 864 days.

(21) Appl. No.: 11/669,416

(22) Filed: Jan. 31, 2007

(65) Prior Publication Data
US 2007/0200859 A1 Aug. 30, 2007

Related U.S. Application Data

(60) Provisional application No. 60/776,416, filed on Feb. 24, 2006.

(51) Int. Cl.
G06F 13/12 (2006.01)
G06F 13/38 (2006.01)

(52) U.S. Cl. .............................. 710/62; 710/64; 709/208

(58) Field of Classification Search ................ None
See application file for complete search history.

(56) References Cited

U.S. PATENT DOCUMENTS

| 5,793,923 | A * | 8/1998 | Sawanobori ............... 386/46 |
| 6,119,189 | A | 9/2000 | Gafken et al. |
| 6,219,023 | B1 * | 4/2001 | Kim ........................... 345/698 |
| 6,310,922 | B1 * | 10/2001 | Canfield et al. ........ 375/240.28 |
| 6,914,637 | B1 * | 7/2005 | Wolf et al. .................. 348/473 |
| 7,088,398 | B1 * | 8/2006 | Wolf et al. ............... 348/423.1 |
| 7,096,285 | B2 * | 8/2006 | Ellerbrock et al. ............. 710/69 |
| 7,339,959 | B2 * | 3/2008 | Nio et al. ..................... 370/535 |
| 7,454,537 | B1 * | 11/2008 | Xue ............................. 710/52 |
| 7,519,747 | B1 * | 4/2009 | Cory et al. .................... 710/53 |
| 7,548,675 | B2 * | 6/2009 | Tatum et al. ................. 385/100 |
| 2002/0080280 | A1 * | 6/2002 | Champion et al. .......... 348/584 |
| 2004/0073930 | A1 * | 4/2004 | Demas et al. ................. 725/71 |
| 2006/0209745 | A1 * | 9/2006 | MacMullan et al. ......... 370/328 |
| 2006/0256909 | A1 * | 11/2006 | On et al. ...................... 375/376 |
| 2008/0007616 | A1 * | 1/2008 | Baladhanda yuthapani ................. 348/14.12 |
| 2010/0128176 | A1 * | 5/2010 | Nakajima et al. ........... 348/512 |

OTHER PUBLICATIONS

"Digital Visual Interface DVI, Revision, 1.0," Digital Display Working Group, pp. 1-34, Apr. 2, 1999, full document found at http://www.ddwg.org/lib/Dual_EDID_guide10.pdf.

(Continued)

Primary Examiner—Henry W Tsai
Assistant Examiner—Michael Sun
(74) Attorney, Agent, or Firm—Blakely Sokoloff Taylor & Zafman

(57) ABSTRACT

In some embodiments, a device includes a bus, a parallel source, and a parallel sink. The parallel source is to provide parallel groups of signals including video signals to the bus, wherein the bus has a number of lanes that is fewer than a number of signals used to represent a pixel such that pixels are represented in more than one of the parallel groups. The parallel sink is to receive the parallel groups of signals from the bus, wherein the parallel sink includes a signal extractor to separate at least a portion of the groups of signals into multiple channels, and encoder and serializer circuits to encode and serialize the separated signals. Other embodiments are described and claimed.

18 Claims, 8 Drawing Sheets

OTHER PUBLICATIONS

"High-Definition Multimedia Interface, Specification Version 1.1" pp. i-xiv, 1-9, and 43-82, May 20, 2004, full document found at http://www.hdmi.org/download/HDMI_Specification_1.1.pdf.

White Paper, "Digital Visual Interface & TMDS Extensions" Silicon Image, pp. 1-32, Oct. 2004, found at http://www.siliconimage.com/docs/SiI-WP-007-A.pdf.

Office Action mailed by Chinese Associate Dec. 30, 2009 for Chinese Application No. 200710085210.5 with English language translation.

SIPO, Non-Final Office Action for Chinese Patent Application No. 200710085210.5 mailed Jun. 24, 2010, 4 pp.

* cited by examiner

PARALLEL INTERFACE BUS TO COMMUNICATE VIDEO DATA ENCODED FOR SERIAL DATA LINKS

RELATED APPLICATION

This application claims the benefit of U.S. Provisional Application No. 60/776,416, filed Feb. 24, 2006.

FIELD

Embodiments of the invention relate generally to bus architectures and methods for communicating video and audio signals, and more particularly, to parallel and serial buses for the same.

BACKGROUND OF THE INVENTION

Reliably transmitting high-quality audio-visual signals from a multimedia source to a multimedia sink has been a difficult undertaking as large amounts of data need to be transmitted at high data rates to yield crisp video images and audio sounds. Examples of such sources include DVD players, set-top boxes, audio/video ("A/V") receivers, whereas examples of such sinks include high-definition ("HD") television (or digital television, or "DTV") and computer monitors and/or displays. Analog interfaces, such as composite, super video ("S-Video") and component video interfaces, are traditionally used to transmit audio-visual signals. But the use of these analog interfaces, as well as digital-to-analog conversions used to generate the analog signals, contribute to degradation in signal quality. The degradation of signal quality can be further exacerbated when data compression is applied to audio and video signals.

One approach to ameliorate the drawbacks of the traditional transmission techniques has been the development of a High-Definition Multimedia Interface ("HDMI"), which specifies a protocol for transmitting uncompressed, high-quality digitized audio and video signals via a serial HDMI link. High-Definition Multimedia Interface Specification Version 1.0 was published on Dec. 9, 2002 and is available at www.hdmi.org. There are also HDMI specification versions 1.1, 1.2, 1.2a, 1.3 and 1.3a. Further, HDMI provides for a high-speed, high-quality serial link between HDMI transmitters (i.e., transmitters disposed within "HDMI sources," such as television set-top boxes, DVD players, etc.) and HDMI receivers (i.e., receivers disposed within "HDMI sinks," such as computer monitors, HDTVs and other HD video displays). Another standard for video is the Digital Visual Interface (DVI) revision 1.0 standard dated Apr. 2, 1999, available from the Digital Display Working Group at www.ddwg.org. Unified Display Interface ("UDI") is another interface standard available from the UDI working group at www.udiwg.org. HDMI was design with the objective that its signals could be transmitted with a DVI transmitter.

Transition minimized differential signaling (TMDS) uses ten bits to represent eight bits and maintain a balance between the number of 0s and 1s in the signal over time to achieve a sustained average DC level. TMDS involves two stages. In the first stage, each bit is either XOR or XNOR transformed against the previous bit with the first bit not being transformed. The encoder chooses between XOR and XNOR by determining which will result in the fewest transitions with the ninth bit indicating which was used. In the second stage, the first eight bits are optionally inverted to even out the balance of ones and zeroes and achieve a sustained average DC level. The tenth bit indicates whether the inversion took place. An overview of TMDS is provided in the DVI revision 1.0 document dated Apr. 2, 1999, chapter 3. DVI and HDMI are each a TMDS-based signaling protocol.

DVO (digital video out) and SDVO (serial digital video out) are well known video connector ports developed by Intel Corporation for use in connection with motherboards.

Various low pin count devices have been proposed in which a narrow, high speed interface is used to communicate a wider group of signals between semiconductor chips (also called dies or dice).

HDMI transmitters typically include functional blocks both for formatting the data representing audio and video signals into HDMI-compliant signals and for serializing those signals. While HDMI transmitters are functional, their internal conventional structural links and processes for transferring data between those functional blocks do not readily facilitate the physical separation of those functional blocks while maintaining HDMI-compliant data transfers external to the transmitter.

SUMMARY OF THE INVENTION

In some embodiments, a device includes a bus, a parallel source, and a parallel sink. The parallel source is to provide parallel groups of signals including video signals to the bus, wherein the bus has a number of lanes that is fewer than a number of signals used to represent a pixel such that pixels are represented in more than one of the parallel groups. The parallel sink is to receive the parallel groups of signals from the bus, wherein the parallel sink includes a signal extractor to separate at least a portion of the groups of signals into multiple channels, and encoder and serializer circuits to encode and serialize the separated signals.

In some embodiments, the device is a system video and audio source device that is coupled to a system video and audio sink through a serial link in a cable.

In some embodiments, an apparatus includes parallel input ports configured to receive subsets of parallel encoded signals. The apparatus also includes a signal extractor configured to extract groups of bits from the subsets of the parallel encoded signals to form extracted groups; and a number of serializers each of which is configured to at least serialize one of said extracted groups to form a serialized group, wherein said serialized group is transmitted via a serial link.

In some embodiments, a repeater for regenerating encoded signals for transmission over one or more serial links includes one or more inbound serial data links, and one or more parallel sources configured to encoded signals from said one or more inbound serial data links. The repeater further is configured to generate parallel encoded signals; and one or more parallel sinks configured to extract groups of bits from said parallel TMDS-based signals. It is further configured to serialized said groups of bits for transmission over said one or more serial links; and one or more parallel buses for carrying said parallel encoded signals from said one or more parallel sources to said one or more parallel sinks.

Additional features of these and other embodiments are described and claimed.

BRIEF DESCRIPTION OF THE FIGURES

Embodiments of the invention are more fully appreciated in connection with the following detailed description taken in conjunction with the accompanying drawings.

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Figure 1:
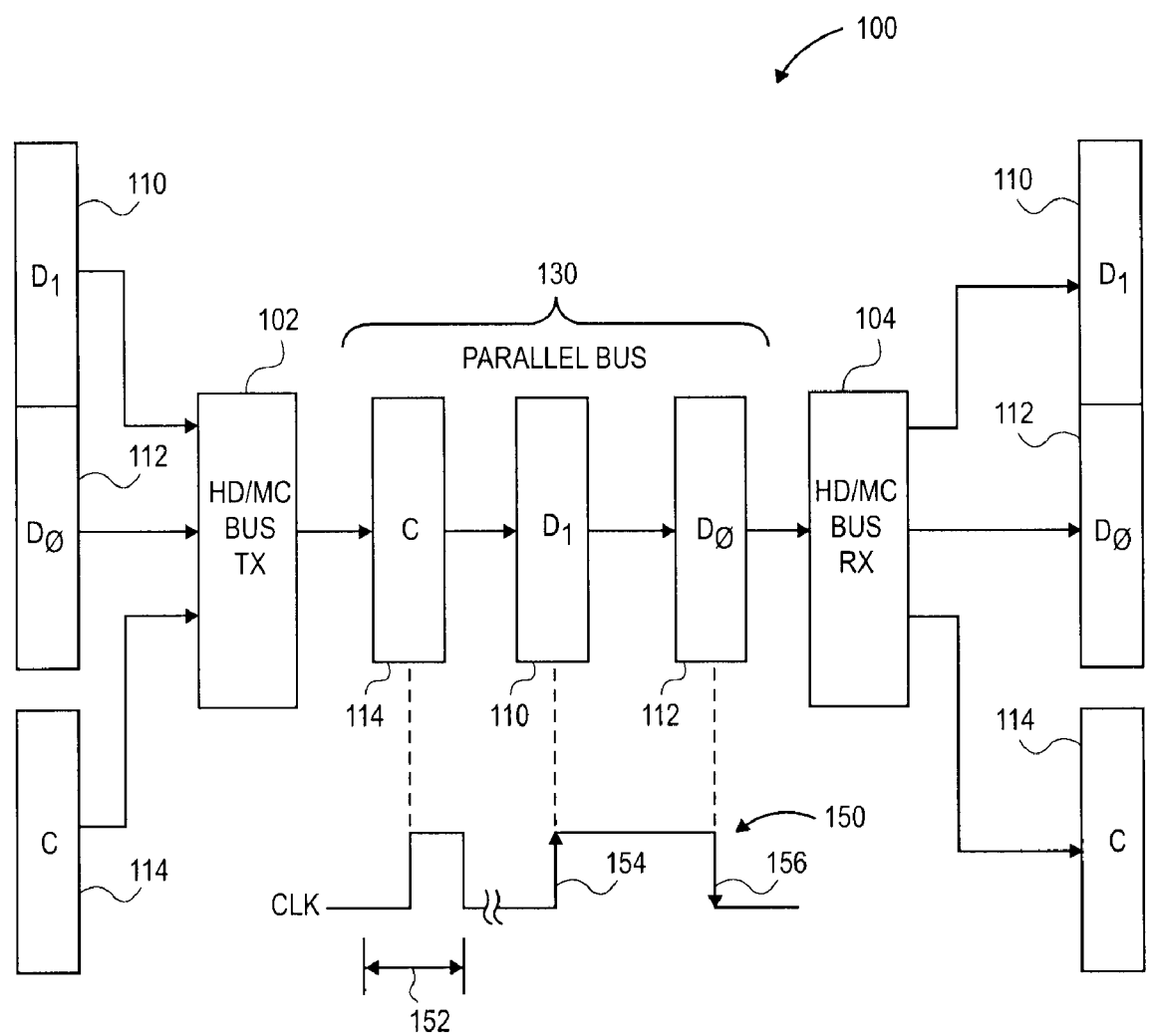
FIG. 1 is a functional block diagram representation of communication of data representing uncompressed, digitized video and digitized audio via a parallel communications link according to some embodiments of the invention.

FIG. 1 is a functional block diagram 100 illustrating the communication of parallel signals carrying at least video encoded for transmission over serial data links, according to some embodiments of the invention. In some embodiments, the parallel signals represent uncompressed, digitized high-definition ("HD") video and digitized multi-channel audio ("MC") signals and transit a parallel communications link, such as shown in FIG. 1. Specifically, this figure depicts an HD/MC bus transmitter ("Tx") 102 configured to transform high-definition video and/or multi-channel audio ("HD/MC") data signals into a format suitable for transportation via a parallel HD/MC bus 130 to an HD/MC bus receiver ("Rx") 104. HD/MC bus Tx 102 operates to divide an "m"-bit wide set of parallel data signals each of which represents a bit in an m-bit word. The m-bit word can include bits representing either a pixel or a sample of digitized audio. HD/MC bus Tx 102 receives the m-bit wide set of parallel data signals and then divides that m-bit word into a set of upper-order bits ("D1") 110 and a set of lower-order bits ("D0") 112, collectively referred to as data bits. In some embodiments, HD/MC bus Tx 102 can receive control signals including control bits ("C") 114 used to facilitate transport of HD/MC data signals—at least in part—via a serial communications link (not shown) located downstream of HD/MC bus Rx 104. As used herein, the term "high-definition" in some embodiments can describe any television video having equivalent resolutions of 720p or 1080i/p, or finer, according to the Advanced Television Systems Committee ("ATSC"). However, some embodiments of the invention are used in connection with video signals that are not HD signals and are audio signals that are not MC audio signals.

During transmission of HD/MC signals, HD/MC bus Tx 102 drives control bits 114 onto parallel HD/MC bus 130 during one or more clock cycles of a clock signal. In some embodiments, HD/MC bus Tx 102 can drive each of upper-order bits 110, lower-order bits 112 and control bits ("C") 114 over HD/MC bus 130 during one or more clock cycles 152 at one or more edges of clock 150. In the example shown, HD/MC bus Tx 102 can drive upper-order bits 110 onto parallel HD/MC bus 130 during a first clock edge 154, and then can drive lower-order bits 112 on a second clock edge 156. While parallel HD/MC bus 130 can be configured to have any bit width, it can be described as having a bit width of "n" (i.e., it is "n" bits wide) where n is less than m. In turn, HD/MC bus Rx 104 receives control and data signals conveying control bits 114 and data bits 110 and 112, respectively. Generally, HD/MC bus Rx 104 can also re-time the transfer of data bits 110 and 112 so as to make them available coincident with a clock cycle as if they were again restored to the pre-transmitted bit width of m-bits. Note that lower-order bits 112 and higher-order bits 110, as well as control bits 114, can be transmitted in any order and on any clock edge of one or more clocks. Accordingly, control bits 114 can be transported between HD/MC bus Tx 102 and HD/MC bus Rx 104 on the same physical path as lower-order bits 112 and higher-order bits 110 prior to transmission on a serial communications or data link. As such, parallel HD/MC bus 130 advantageously reduces the number of interconnections between HD/MC bus Tx 102 and HD/MC bus Rx 104 (e.g., reducing the number of interconnections to n, rather than requiring m interconnections). This reduction conserves resources, such as the amount of substrate (i.e., by reducing die size) that otherwise would be consumed to provide for interconnections, such as by, for example, using m number of wire bonding pads.

Figure 8:
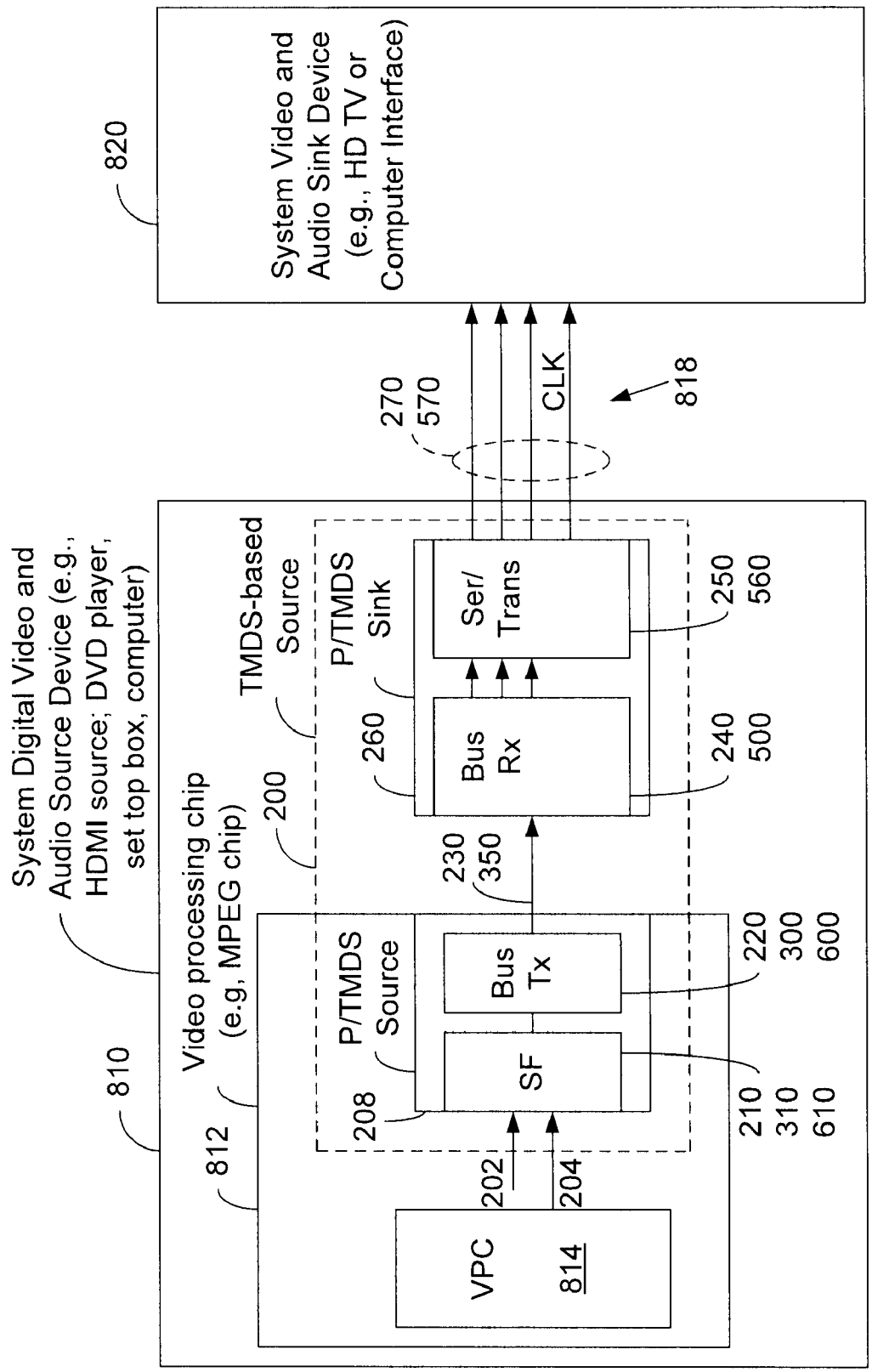
FIG. 8 is a block diagram illustrating a system according to some embodiments of the invention.

FIG. 8 shows a system that may be used in connection with some embodiments of the invention. FIG. 8 includes some components and reference numbers that are included in FIGS. 2, 3, 5, and 6, and shows one possible arrangement for these components. However, in other embodiments, the components are in a system different than in FIG. 8. Referring to FIG. 8, a system digital video and audio source device 810 provides color separated, serialized signals on a serial communications link 270 (or 570) to a system video and audio sink device 820. Link 270 is in a cable 818 that may be several meters long. As examples, source device 810 may be or include a DVD player, a set top box, a computer, or other device that provides signals according to an HDMI standard or according to some other format. As examples, sink device 820 may be a display and audio device such as an HDTV or a computer interface chip.

Source 810 includes a video processing chip 812 (for example, an MPEG chip or a graphics chip). In some embodiments, chip 812 also processes audio signals and in other embodiments, it does not. Video processing chip 812 includes video processing circuitry 814 that provides video signals to signal format circuit 210 (or 310 or 610). Signal format circuit 210 provides video, audio, and control signals to a bus transmitter 220 (or 300 or 600), which in turn provides them on a smaller number of parallel point-to-point conductors of a bus 230 (or 350) to a bus receiver 240 (or 500). Bus receiver 240 is included in a physical layer (PHY) chip 260 which serializes the received parallel signals and places them in the format used on link 270.

Video processing chips 812 is suitable for providing signals on only very short conductors to other chips in the same device, not on long cables such as cable 818. On the other hand, phy chip 260 is suitable for transmitting chips on link 270 in cable 818. The video, audio, and control signals are provided in a parallel format on bus 230 as described in connection with the other figures. Accordingly, signal formatter 210 and bus transmitter 220 are in a parallel video and audio source 208. As an example, the signals from transmitter 220 are TMDS signals such that parallel video and audio source 208 is referred to as a parallel TMDS source (P/TMDS source) and PHY chip 260 (which is a parallel video and audio sink) is referred to as a parallel TMDS sink (P/TMDS sink). However, in other embodiments, parallel source 208 and parallel sink 260 do not involve TMDS signals. In some of these other embodiments, the signals may be similar to TMDS signals but not precisely TMDS signals, such as following an Bb10b coding to achieve DC balance.

As shown in FIG. 8, a clock signal is provided through link 270 and cable 818 to sink device 820. In other embodiments, a clock signal is recovered through the data, so a clock signal is not provided through link 270 to sink 820.

Figure 2:
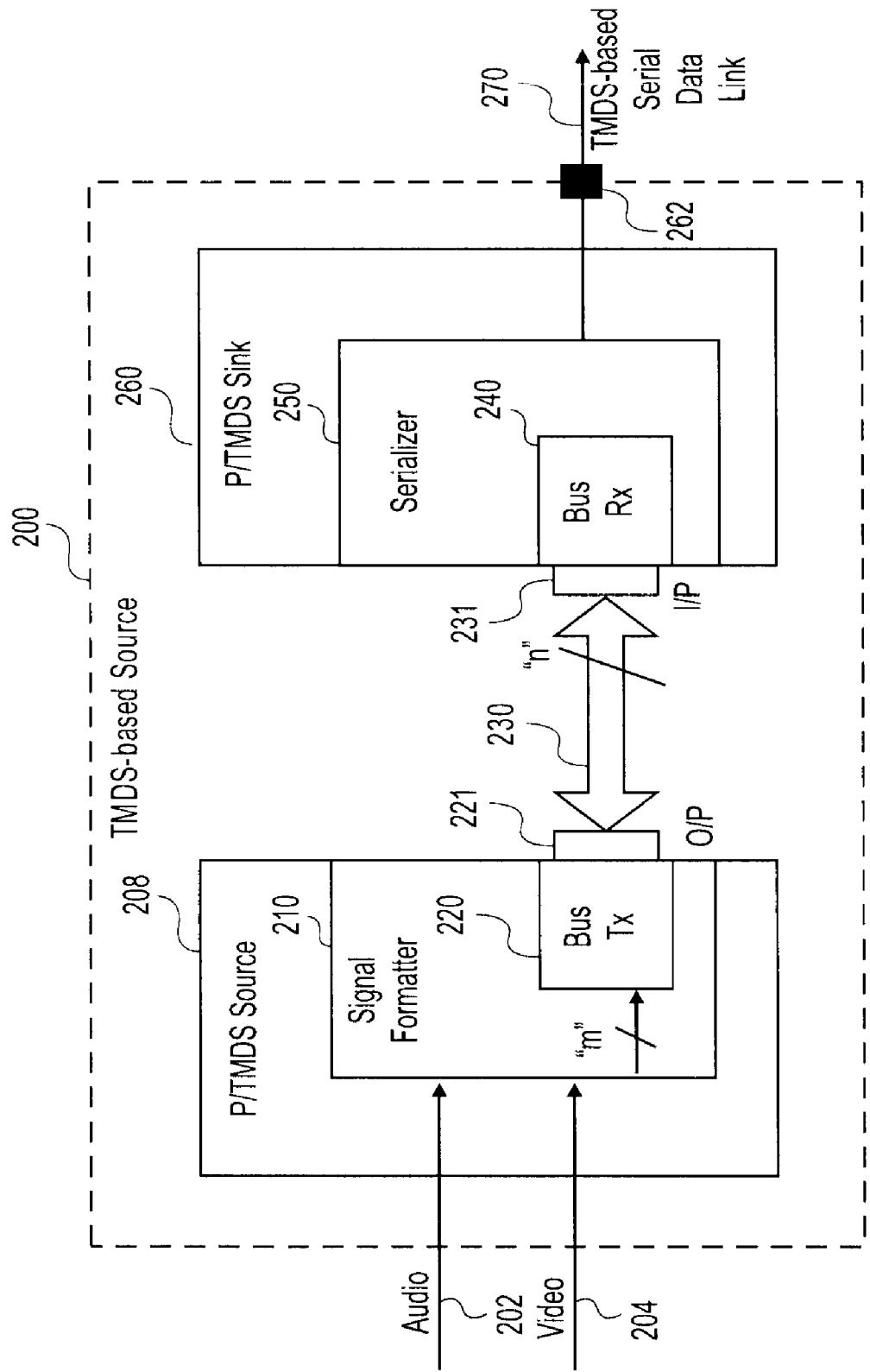
FIG. 2 is a block diagram representation of a multimedia source that includes a parallel digital video interface source, a parallel bus, and a parallel digital video interface sink according to some embodiments of the invention.

FIG. 2 illustrates a source or transmitter that implements a parallel HD/MC bus configured to communicate parallel high-definition/multi-channel ("HD/MC") signals between a signal formatter and serializer, according to an embodiment of the invention. In this example, TMDS-based source 200 implements the parallel HD/MC bus of FIG. 1 to communicate at least parallel HD/MC data signals between a signal formatter 210 and serializer 250, according to an embodiment of the invention. Signal formatter 210 is configured to format audio signals 202 and video signals 204 from well-known audio and video format types into a specific format for communicating HD/MC data via a serial communications link 270. One example of such a format is based on TMDS as discussed above. Serializer 250 is configured to serialize parallel data signals and parallel control signals for retransmission via serial communications link 270 in the format specified by signal formatter 210. In some embodiments, bus Tx 220 and bus Rx 240 share similar functionalities with HD/MC bus Tx 102 and HD/MC bus Rx 104, respectively. Link 270 may include four differential pairs: three channels for video and audio with control signals and one channel for a clock signal (if the clock is transmitted between chips).

In a specific embodiment of the invention, a parallel HD/MC bus 230 is disposed within a TMDS-based source 200, which has an output 262 for transmitting data in accordance with TMDS-based signaling protocol onto serial data link 270. TMDS-based source 200 also includes a parallel TMDS source ("P/TMDS Source") 208 and a parallel TMDS sink ("P/TMDS Sink") 260. In some embodiments, parallel TMDS source 208 can be a device that includes signal formatter 210, bus TX 220 and an output port ("O/P") 221 (also referred to as a parallel TMDS output ports) for transmitting parallel TMDS data signals onto parallel HD/MC bus 230. Parallel TMDS sink 260 can be another device that includes bus Rx 240, serializer 250, and an input port ("I/P") 231 (also referred to as a parallel TMDS input ports) for receiving data signals from parallel HD/MC bus 230. Depending on the terminology used, port 221 can be considered a single port or a group of ports, one for each lane in the bus. Likewise, for port 231. In some embodiments, the term "parallel TMDS signals," or variants thereof, refers to any signal that includes, for example, data (such as video and/or audio data) encoded to comply with TMDS-based signaling protocols and when serialized (e.g., by serializer 250) for transmission onto serial data link 270. As such, "parallel TMDS-based data signals" and "parallel TMDS-based control signals" are parallel signals containing data bits and control bits, respectively, that are encoded to comply with a TMDS-based signaling protocol (e.g., when serialized and sent over a TMDS-compliant serial link). Note, too, that parallel HD/MC bus 230 can be used to implement a "parallel TMDS-based bus." In various embodiments, parallel TMDS source 208, parallel HD/MC bus 230 and parallel TMDS sink 260 can constitute—in whole or in part—any of the following: a Digital Visual Interface ("DVI") source for transmitting data signals in accordance to a DVI specification; a unified display interface ("UDI") source for transmitting data signals in accordance to recommendations set forth by a UDI specification maintained by the UDI Special Interest Group; an internal TMDS ("iTMDS") source for transmitting as defined by Silicon Image, Inc. of Sunnyvale, Calif.; and any other similar type of signaling protocols.

In some embodiments, TMDS-based source 200 constitutes a High-Definition Multimedia Interface ("HDMI") source (or transmitter) for transmitting HDMI-compliant data signals over serial data link 270. Accordingly, signal formatter 210 and serializer 250 implement an HDMI formatter within parallel TMDS source 208 and a transition-minimized differential signaling ("TMDS") transmitter within parallel TMDS sink 260, respectively. As such, signal formatter 210 operates to generate "m" parallel HDMI data signals during an HDMI data period and parallel HDMI control signals during an HDMI control period. For example, signal formatter 210 can generate 24 parallel HDMI data signals that contain 24 data bits per clock cycle and at least 4 parallel HDMI control signals that contain 4 bits of control bits per clock cycle. Advantageously, parallel HD/MC bus 230 reduces the number of interconnects that otherwise are required to transmit the 24 parallel HDMI data signals to a TMDS transmitter. Bus 230 includes "n" lanes of interconnect conductors to carry the "n" signals. In the example, n may be 12 and m may be 24. A lane may include one conductor in the case of single ended signaling and two conductors in the case of differential signaling.

Further, parallel HD/MC bus 230 enables signal formatter 210 to be formed on a different substrate than is serializer 250 so that each can be produced by separate manufacturing processes. Traditionally, signal formatter 210 and serializer 250 are formed in relatively complicated mixed signal manufacturing processes. Such mixed signal processes are more complicated because they employ both digital integrated circuit ("IC") fabrication processes to build signal formatter 210 and analog integrated circuit fabrication processes to build serializer 250. So by implementing parallel HD/MC bus 230, signal formatter 210 and serializer 250 can be separately manufactured in more suitable fabrication processes, thereby simplifying manufacturing and increasing reliability of each. Moreover, parallel HD/MC bus 230 can reduce the pin out (i.e., total number of input and/or output pins) when signal formatter 210 and serializer 250 are encapsulated in different electronic device packages or otherwise require mechanical interconnections to be formed between the two. Note that the term "pin" is used to mean a connection with the chip (also called a die) regardless of its structure. It does not have to be an elongated structure that fits into a slot. For example, a pin can be a bond pad or something connected to it.

Figure 3:
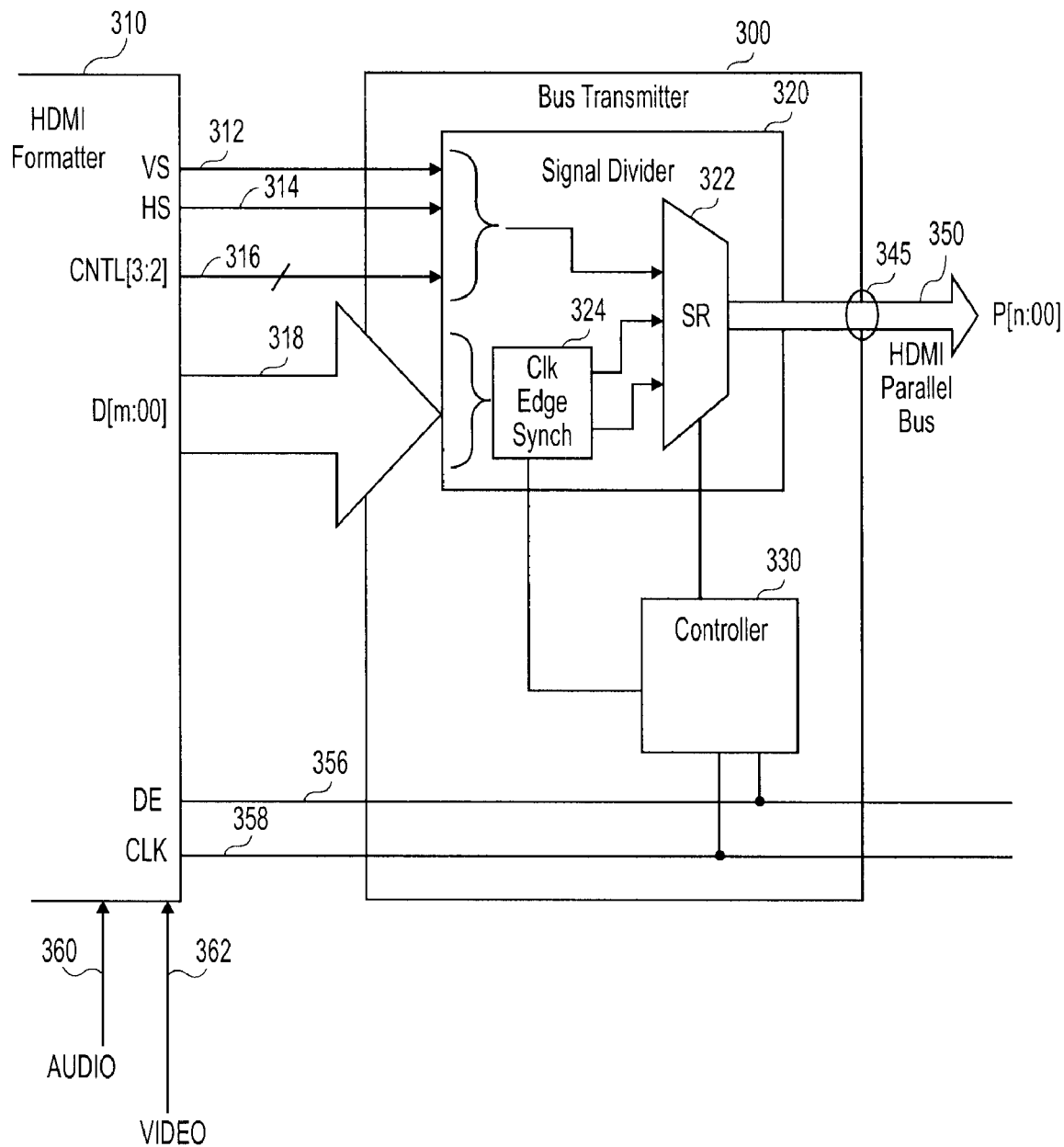
FIG. 3 is a block diagram representation illustrating a parallel HDMI bus transmitter that is suitable to implement the bus transmitter of FIG. 2 according to some embodiments of the invention.

FIG. 3 is a block diagram illustrating a parallel HDMI bus transmitter 300 that is suitable to implement bus transmitter 200 of FIG. 2, according to some embodiments of the invention. Other embodiments have different details. Parallel HDMI bus transmitter 300 includes a signal divider 320 and a controller 330 to control the division and transmission of parallel HDMI signals. Signal divider 320 operates to divide "m"-bit wide set of parallel HDMI data signals into two or more subsets of the parallel HDMI data signals, each of which has a bit width of n (or less). For example, if a set of parallel HDMI data signals includes 24 bits to represent a pixel, then subsets of the parallel HDMI data signals can include 12 bits (i.e., two subsets of 12 bits contain pixel data for one 24-bit pixel). In some embodiments, bus transmitter 300 may be thought of as a DVI transmitter that transmits HMDI signals because formatter 310 puts the signals in an HDMI format and transmitter 300 transmits them.

In some embodiments, signal divider 320 includes a clock edge synchronizer ("Clk Edge Synch") 324 to synchronize the transmission of each of the n-bit subsets with either a rising clock edge or a falling clock edge. Signal divider 320 also includes a signal router ("SR") 322 that operates in accordance with controller 330 to route either subsets of parallel HDMI data signals or parallel HDMI control signals onto a parallel HDMI bus. Note that, at least in some embodiments, clock edge synchronizer 324 can implement double data rate converter for converting data transmission from one bit per clock cycle to two bits. In various embodiments, clock edge synchronizer 324 can be configured to transmit a single bit per clock cycle, or it can transmit multiple subsets of bits for pixel data over multiple data cycles to further reduce the bus width, thereby reducing the pin out for an integrated circuit package containing parallel HDMI bus transmitter 300. For example, parallel HDMI data signals can include 6 bits per clock cycle or clock edge (i.e., 4 subsets of 6 bits of pixel data for one 24-bit pixel). As another example, parallel HDMI data signals can include 12 bits per clock cycle or clock edge (i.e., 4 subsets of 12 bits of pixel data for one 48-bit pixel). Generally, any number of bits can represent pixel data, portions of which can be distributed over any number of subsets. Each subset can have the same or different number of bits for each portion of the pixel data, with those subsets being clocked at either one edge or two edges per clock cycle.

In the example shown, the signal formatter is an HDMI protocol formatter 310 (or HDMI formatter), which is configured to receive audio signals 360 and video signals 362 in well-known audio-visual format types. HDMI protocol formatter 310 then formats audio signals 360 and video signals 362 to comply with HDMI requirements when serially transmitted over an HDMI-compliant link. That is, HDMI protocol formatter 310 generates parallel HDMI data signals and parallel HDMI control signals that will comply with, for example, the High-Definition Multimedia Interface Specification version 1.1 when encoded and serialized by a TMDS transmitter. The HDMI Specification is maintained by HDMI Licensing, LLC. TMDS® is a registered trademark of Silicon Image, Inc., of Sunnyvale Calif. However, the term TMDS is not used herein as a trademark, but rather is used as is described in paragraph [0005] in the background section. In some embodiments, HDMI protocol formatter 310 generates the following control signals: vertical synch ("VS") 312, horizontal synch ("HS") 314, and control bits three and two ("CNTL[3:2]") 316. Advantageously, HDMI protocol formatter 310 need not generate nor transfer control bits one and zero ("CNTL[1:0]") to bus transmitter 300, which in turn, can forego the communication of control bits one and zero ("CNTL[1:0]"). By omitting control bits one and zero ("CNTL[1:0]"), parallel bus bandwidth and processing time can be preserved.

HDMI protocol formatter 310 also generates two additional signals shown as display enable ("DE") 356 and clock ("Clk") 358, which can be referred to as the pixel clock in some embodiments. It also generates parallel HDMI data signals ("D[m:00]") 318 composed of data bits that are generated to represent m bits of video, audio and/or auxiliary data. Auxiliary data can refer in some embodiments to any data that describes the active audio or video stream, including the characteristics of the HDMI source. That is, the HDMI auxiliary signals can include audio signals. Parallel HDMI bus transmitter 300 is configured to convey display enable 356 and clock 358 to controller 330. Also, parallel HDMI bus transmitter 300 is configured to convey parallel HDMI data signals 318 as well as parallel HDMI control signals 312, 314, and 316 to signal divider 320. Display enable 356 and clock 358 signals propagate to controller 330, which controls operation of signal router 322. Note that in alternative embodiments, HDMI protocol formatter 310 can be replaced by one or more of: a DVI protocol formatter, a UDI protocol formatter, an iTMDS protocol formatter, or any other TMDS-based protocol formatter.

Continuing with the example shown in FIG. 3, controller 330 is configured to govern operation of signal router 322 to apply parallel HDMI control signals 312, 314, and 316 to parallel HDMI output ports ("P[n:00]") 345 during a control period and to apply subsets of parallel HDMI data signals 318 to those same output ports during an HDMI data period. Advantageously, control signals vertical synch 312, horizontal synch 314, and control bits three and two 316 can be transmitted over the same physical path as the parallel HDMI data signals. Among other things, this at least decreases the pin outs of packages used to encapsulate parallel HDMI bus transmitters and parallel HDMI bus receivers. As an example, in some embodiments, ports 345 are DVO ports, but in other embodiments, that is not the case.

Note that an HDMI data period in some embodiments refers to either a video data period or a data island period. During the video data period, the parallel HDMI data signals include pixel data, whereas during the data island period the parallel HDMI data signals include audio and auxiliary data. In a specific embodiment, controller 330 is configured to control signal router 322 in response to the state of display enable signal 356. When display enable signal 356 is in a first state, then control signals are gated onto parallel HDMI bus 350, whereas when that signal is in a second state, then data signals are gated onto the bus. In some embodiments, the Clk and DE signals are considered part of the HDMI parallel bus 350.

Controller 330 is also configured to govern operation of clock edge synchronizer 324. After signal divider 320 divides parallel HDMI data signals 318 into subsets of bits, then clock edge synchronizer 324 synchronizes each of the subsets to a clock edge of clock 358. In some embodiments, clock edge synchronizer 324 can perform the division by clocking each subset out at different times to signal router 322. Or in other embodiments, signal router 322 performs the division by selectively routing subsets onto parallel HDMI bus 350. Regardless, consider that after signal divider 320 divides a set of 24 bits of parallel HDMI data bits into two subsets of 12 bits, then clock edge synchronizer 324 synchronizes the first subset of 12 bits with a first clock edge and the second subset of 12 bits with a second clock edge. Thereafter, signal router 322 gates one of the subsets onto parallel HDMI bus 350, with the other subset following in time. Note that in some embodiments subsets of parallel HDMI data signals 318 can be composed of a number of bits having a bit width, n, which is a suitable width for transmitting the subsets over parallel HDMI bus 350. The bit width, n, of the subsets is less than the bit width of parallel HDMI data signals ("D[m:00]") 318, which has bit width of m bits.

In various embodiments, audio signals 360 and video signals 362 are converted from well-known audio-visual format types into an HDMI format. Examples of well-known audio signal format types include Sony/Philips Digital Interface ("S/PDIF") audio, audio data driven from an I2S (or Inter-IC Sound) serial bus, multiple channeled pulse code modulated ("PCM") audio, which is uncompressed, audio formatted as IEC60958-192 kHz, audio formatted as IEC61937-96 kHz, and multiple channel-encoded audio (e.g., audio encoded by Dolby Digital techniques, DTS techniques, or any other 7.1 (or higher) surround sound encoding). Examples of well-known video signal types include high-definition television signals having resolutions from 720p and 1080i/p on up, as well as computer-generated video having resolutions from UXGA (i.e., 1600 pixels by 1200 lines) pixels on up, such as WUXGA ("Wide Ultra eXtended Graphics Array") resolutions of 1200 pixels by 1920 lines. Those video signal types can be in implemented in well-known color spaces as defined by ITU-R BT656 & 601, 12 bit YCbCr 4:2:2, 24 bit YCbCr 4:2:2, and 24 bit RGB YCbCr 4:4:4.

Figure 4:
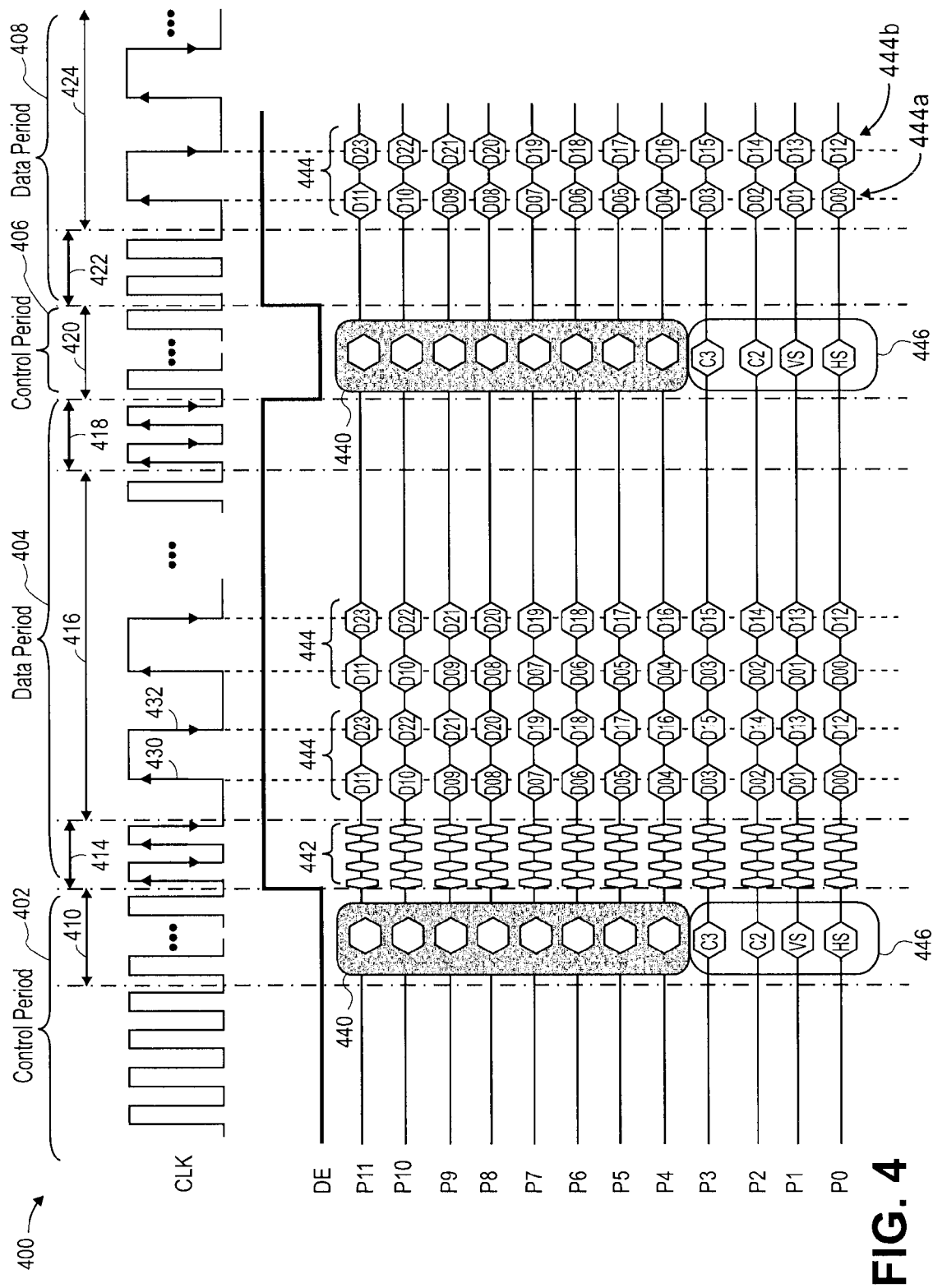
FIG. 4 illustrates a timing diagram depicting the timing of transporting subsets of parallel HDMI data signals and parallel HDMI control signals over a parallel HDMI bus in accordance with some embodiments of the invention.

FIG. 4 illustrates a timing diagram 400 illustrating the timing of transporting subsets of parallel HDMI data signals and parallel HDMI control signals over a parallel HDMI bus in accordance with some embodiments of the invention. In the example shown, ports having port number zero (i.e., P0) to port number 11 (i.e., P11) each can represent either an output port from an HDMI bus transmitter or an input port of an HDMI bus receiver. Port numbers P0 to P11 convey both control signals and data signals. In particular, a parallel HDMI bus transports control signals during control periods 402 and 406 and transports data signals during data periods 404 and 408. Control period 402 includes a preamble interval 410 during which control signals 440 and 446 are transported across a parallel HDMI bus. Control signals 446 include a horizontal synch signal (e.g., an HS bit), a vertical synch signal (e.g., a VS bit), and control signals two and three (e.g., control bits 2 and 3), each of which are driven over respective ports P0 to P3. Optionally, additional control signals 446 can be transmitted over ports P4 to P11, such as control signal zero and one (e.g., control bits 0 and 1). Data period 404, as a data island period, includes a guard band interval 414, an HDMI data signal transmission interval 416 and another guard band interval 418. A parallel HDMI bus transports guard band signals 442 (e.g., guard band bits) during guard band interval 414. Next, a clock edge synchronizer synchronizes signals at both rising and falling edges of clock CLK during interval 416 to effectuate double data rate transfer of audio and/or auxiliary data bits. For example, during a rising edge 430, parallel HDMI data bits D[11:0] are transmitted out from port numbers P[11:0] of a parallel HDMI bus transmitter, whereas during a falling edge 432, data bits D[23:12] are transmitted out from the same port numbers. As such, data bits D[11:0] and D[23:12] combine to represent one or more parallel HDMI data signals 444a and 444b that can be transported during a single clock cycle. A trailing guard band 418 follows signaling the end of data period 404 (guard band signals not shown).

Control period 406 is similar to that of control period 402, but it includes a preamble interval 420 during which control signals signal that a video data period is to follow. Regardless, control signals 440 and 446 are transported during this interval. Following control period 406 is data period 408, which is a video data period. Data period 408 includes a guard band interval 422 (guard band signals not shown) and an HDMI data signal transmission interval 424 during which data bits D[11:0] and D[23:12] represent parallel HDMI data signals containing, for example, 24 bits of data 444 for pixels.

Note that FIG. 4 is merely illustrative of an implementation of transporting control signals and data signals over certain ports and interconnection lines; specific control and data signals can be transported over any of the ports shown and during any appropriate interval. Also note that the number of ports can be decreased so long as the number of bits transported over a single interconnection or via a single port is increased (e.g., ports P0 to P6 can transport 24 bits over 4 clock edges of two clock cycles). Note that the exaggerated widths of the clock signal, CLK, during data periods 406 and 408 is to illustrate data transfers and does not imply that the frequency of CLK is any different than during control periods 402 and 408. In some cases, video data coding can be applied to pixels during data period 404 (8 bits converted to 10 bits), TERC4 Coding (4 bits converted to 10 bits) can be applied to packet data (e.g., audio samples or info frames) during guard band interval 414, and control period coding (2 bits converted to 10 bits) can be applied to control signals during control period 402. TERC4 is 4 bit TMDS error reduction coding.

In some embodiments, the following protocol elements can be transmitted between blocks 208 and 260 as shown in the following chart.

| Element | DE | D0-D3 | D4-D23 | Duration (pixel clocks) |
|---|---|---|---|---|
| Preamble | 0 | preamble value, | n.a. | 8 |
| Data Island | 1 | Data Island Guard Band Value | | 2 |
| | 1 | Data Island packet data | | 32 * number of pixels |
| | 1 | Data Island Guard Band Value | | 2 |
| Video Data | 1 | Video Guard Band Value | | 2 |
| | 1 | Video pixel data values | | number of pixels |

In some embodiments, HDMI Data Islands and Guard Bands use a TERC4 encoding technique. The 16 codes produced by this encoding technique are a subset of the available TMDS in-band codes and are all DC-balanced codes. This allows these 16 values to be indicated by transmitting across the P/TMDS 8-bit "input" values that would be TMDS-encoded into the same 10-bit code. With TERC4 of a 0 value, the 8-bit and 10-bit values are 0xXX and 0bXXXXXXXXXX.

DVI uses the following types of encoding (1) control encoding from 2 to 10 bit with 2 bits for each of 3 channels or a total of 8 bits, and (2) 8 bit encoding to 10 bits. HDMI includes a third mode: 4 bits encoded into 10 bits (TERC4). The encoding may be directly from 4 to 10 bits. Alternatively, the encoding may be from 4 to 8 bits, and from 8 bits to 10 bits utilizing the existing 8 to 10 bit encoding mechanism.

Figure 5:
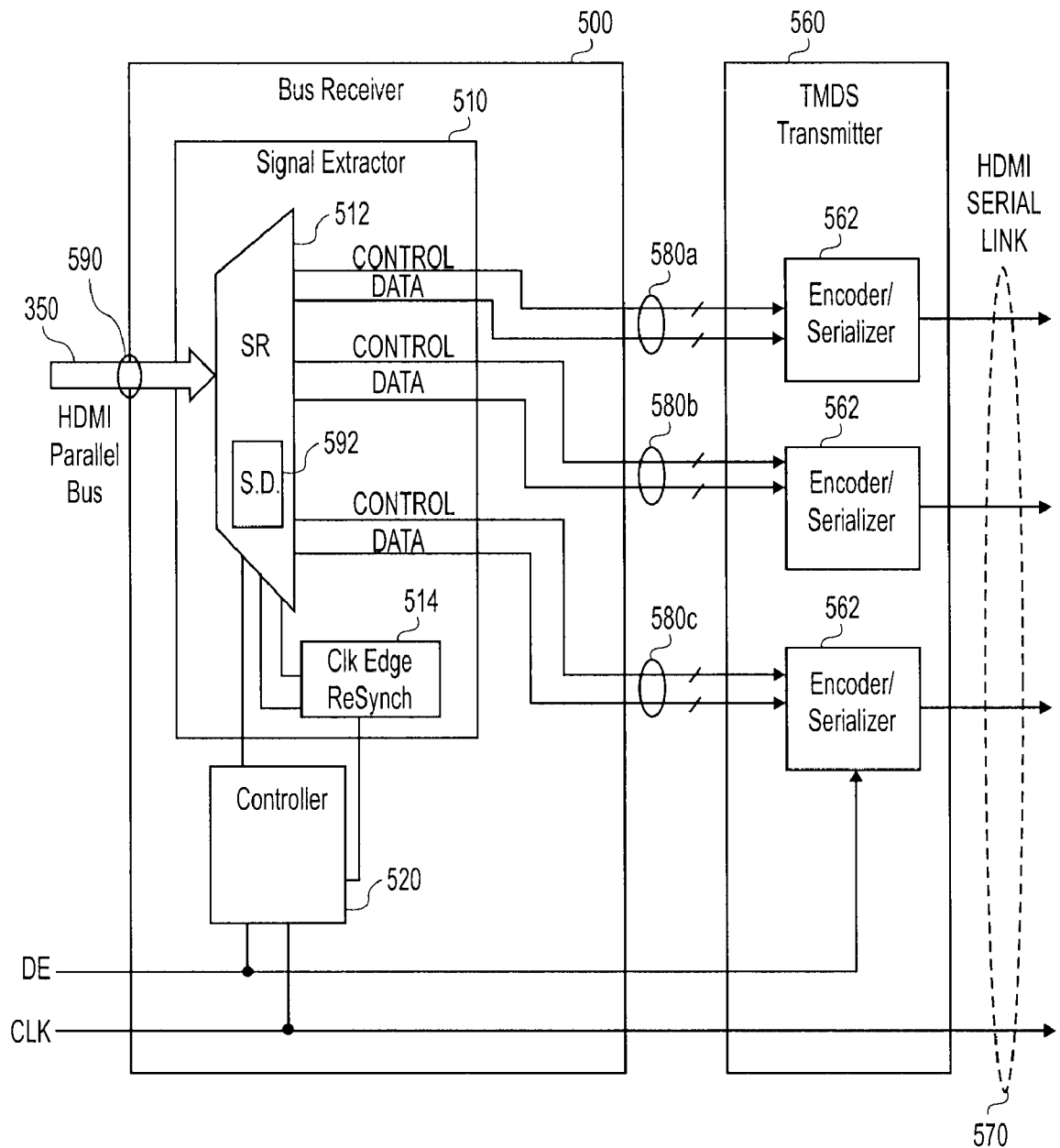
FIG. 5 is a block diagram illustrating a parallel HDMI bus receiver and transmitter in accordance with some embodiments of the invention.

FIG. 5 is a block diagram illustrating a parallel HDMI bus receiver 500 in accordance with some embodiments. Parallel HDMI bus receiver 500 includes a signal extractor 510 and a controller 520 to control receipt and extraction from parallel HDMI signals. Signal extractor 510 operates to extract groups of bits from two or more subsets of the parallel HDMI data signals, each subset being received via parallel HDMI input ports 590 by signal extractor 510 having a bit width of n (or less). In various embodiments, signal extractor 510 identifies and extracts groups of bits 580a, 580b and 580c from the originally generated "m"-bit wide set of parallel HDMI data signals. While signal extractor 510 can reconstruct the "m"-bit wide set of parallel HDMI data signals from the subsets, such reconstruction is not necessary to practice each embodiment of the invention. Rather, signal extractor 510 can first identify from the subsets groups of bits 580 each that is associated with a respective encoder-serializer 562 of a TMDS transmitter 560. Then, signal extractor 510 can retime each of the groups of bits 580 so that they pass during the same clock cycle to encoder-serializers 562. TMDS transmitter 560 then transmits the serialized HDMI data and control signals via HDMI serial link 570. Transmitter 560 may be a DVI transmitter. In various embodiments, parallel HDMI bus receiver 500 can be replaced by a parallel TMDS-based bus receiver for receiving any of the following: DVI formatted data signals; UDI formatted data signals; internal iTMDS formatted data signals; and the like.

In some embodiments, signal extractor 510 includes a clock edge resynchronizer ("Clk Edge Resynch") 514 to resynchronize the transmission of the groups of bits 580a, 580b, and 580c representing HDMI data signals and HDMI control signals. In particular, controller 520 instructs clock edge resynchronizer 514 to resynch the transfer of data from twice a clock cycle to once a clock cycle. Signal extractor 510 also includes a signal router ("S.R.") 512 that operates in accordance with controller 520 to make subsets of the parallel HDMI data and control signals (i.e., groups of bits 580a, 580b, and 580c) coincident with the same clock cycle as if they were again restored into their pre-transmitted bit widths. In some embodiments, a signal detector ("S.D.") 592 identifies those bits representing HDMI data that will eventually transfer to TMDS 560. Note that controller 520 is configured to receive both a display enable signal ("DE") and a clock signal ("CLK"). As such, controller 520 in some embodiments can instruct signal detector ("S.D.") 592 to identify control signals (e.g., CNTL[3:0] or CNTL[3:2] bits) at parallel HDMI input ports 590 during one state of DE (e.g., DE low) and to identify data signals at those ports during another state (e.g., DE high).

Once each subset of bits is identified as being associated with a specific encoder-serializer 562, then signal router 512 can route those bits appropriately. To illustrate, consider that controller 520 identifies, and then selects, 8 bits of a first 12-bit subset of parallel HDMI data bits for transmission to a first encoder-serializer 562. Group of bits 580a includes those 8 bits. Signal extractor 510 then can identify and select 4 bits of the same subset and 4 bits of the second 12-bit subset for transmission to a second encoder-serializer 562. Next, the remaining 8 bits of the second 12-bit subset is then selected for transmission as part of group 580c of bits to a third encoder-serializer 562. Signal extractor 510 then passes those bits (i.e., groups 580a to 580c) during a clock cycle to TMDS transmitter 560. Note that in some embodiments, control signal zero and one (e.g., control bits 0 and 1, or CNTL[1:0]) are omitted for reasons described in FIG. 6. In these cases, controller 520 can instruct signal router 512 to recreate those control bits and insert into any of the groups 580 of bits. For example, parallel HDMI bus receiver 500 can be configured to receive control bits 2 and 3 (or CNTL[3:2]) from parallel HDMI bus 350 and to pass them along with recreated bits (CNTL[1:0]) based on the state of the DE signal carried over parallel HDMI bus 350 or a dedicated physical path. In some instances, controller 520 detects the state of the DE signal and then instructs signal extractor 510 to insert CNTL[1:0] bits as control bits for one or more of groups 580a to 580c. For examples, the bit values shown for CNTL[1:0] bits in table 630 of FIG. 6 can be used.

Figure 6:
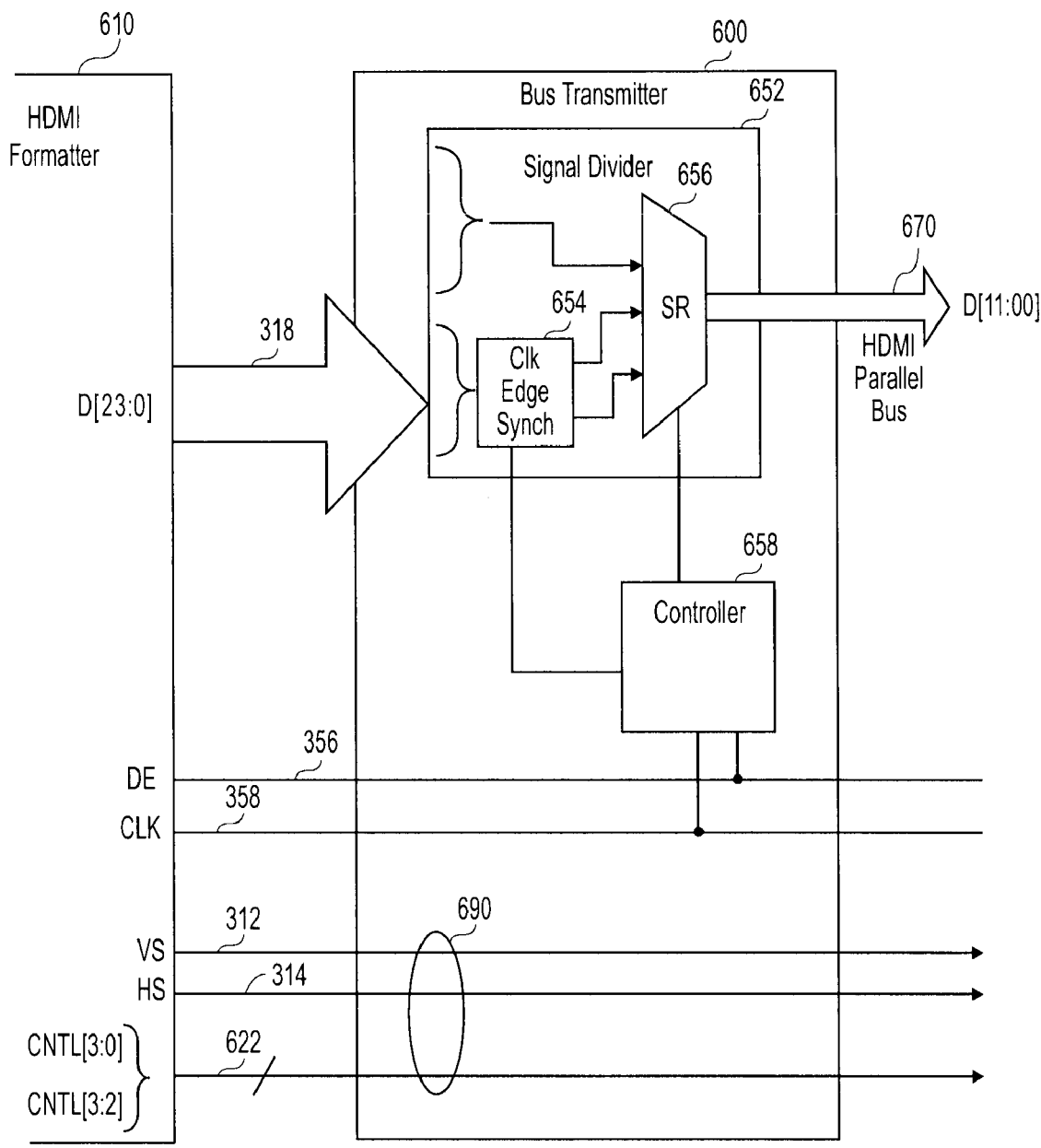
FIG. 6 is a block diagram illustrating another parallel HDMI bus transmitter in accordance with some embodiments of the invention.

FIG. 6 is a block diagram illustrating another parallel HDMI bus transmitter 600 in accordance with another embodiment of the invention. Bus transmitter 600 is similar in structure and functionality of that of FIG. 3, but bus transmitter 600 is not configured to transport HDMI control signals via parallel HDMI bus 670. Rather, vertical synch ("VS") 312, horizontal synch ("HS") 314, and control bits three and two ("CNTL[3:2]") 622 are transmitted via dedicated interconnections that constitute a parallel HDMI control bus 690.

Likewise, signal divider 652 and its signal router ("SR") 656 and clock edge synchronizer ("clk edge synch") 654 as well as controller 658 are similar in structure and functionality of those similarly-named elements of FIG. 3. But these components of FIG. 6 are not configured to transport parallel HDMI control signals via parallel HDMI bus 670. While parallel HDMI bus transmitter 600 increases the number of interconnections between an HDMI bus transmitter and an HDMI bus receiver, the number of interconnections is less than if interconnections were dedicated for each of the set of parallel HDMI data signals that transport data and control signals via bus 670. Note that in some embodiments, each of control bits three to zero (i.e., "CNTL[3:0]") can be transmitted via dedicated interconnections as represented by line 622. But as table 630 illustrates, bits CNTL[1:0] do not change during some intervals. Therefore, they need not be transported over a parallel HDMI bus 670. Rather, they can be recreated at an HDMI bus receiver, for example. In some embodiments, bus transmitter 600 omits the dedicated clock signal CLK line and implements clock recovery techniques. There are various well known clock recovery techniques. See, for example, U.S. Pat. No. 6,845,461 to Kim, in which bus lines are used for carrying both clock and data information at different times. Data signals, which may be either encoded or not, are carried through a subset of the bus lines through a mapping scheme that maps the data information to the bus lines at each data transfer while the clock signals are carried in the remaining bus lines. Various mapping schemes are possible. One or more of these techniques or other clock recovery techniques may be used.

Figure 7:
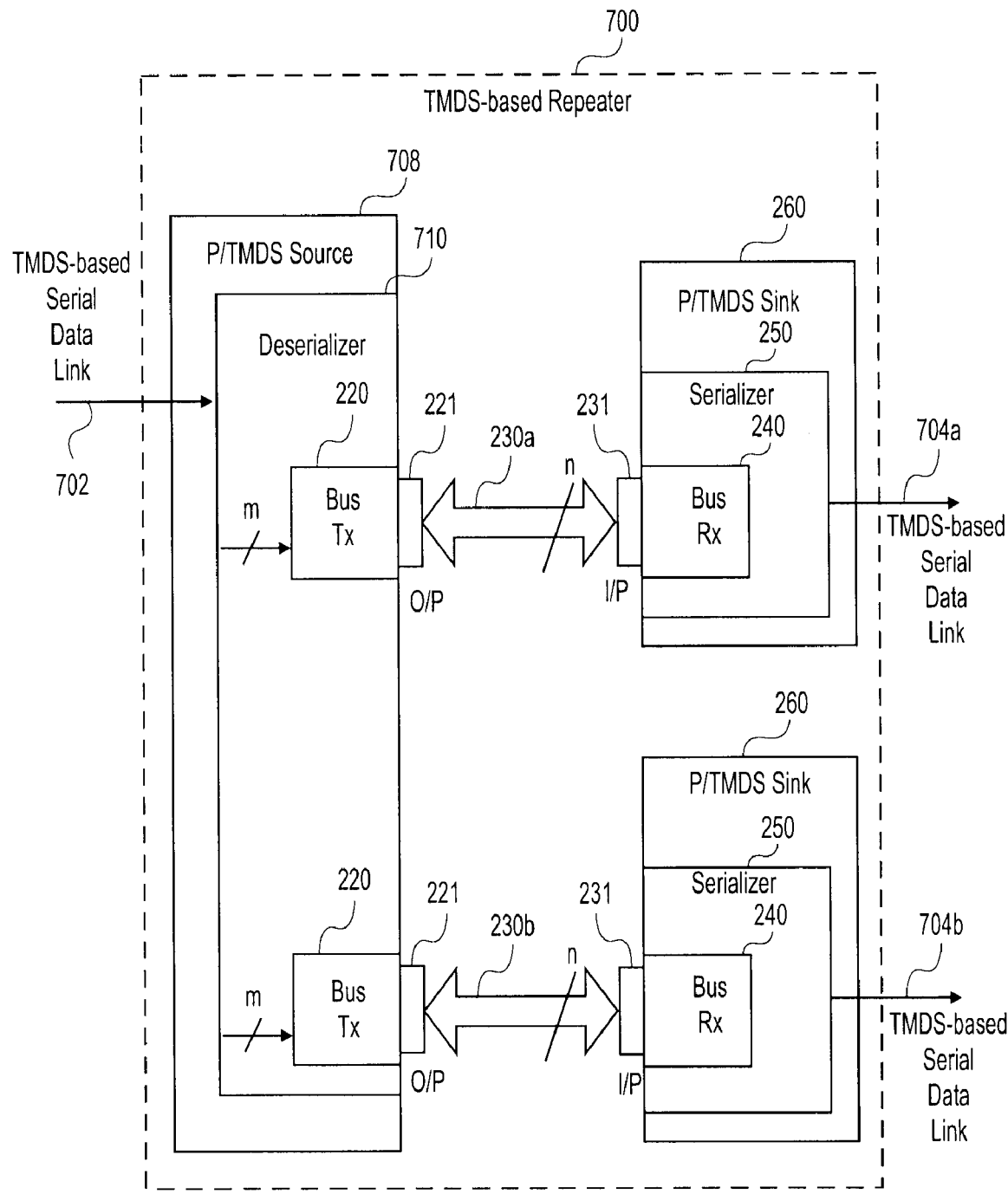
FIG. 7 is a block diagram illustrating a TMDS-based repeater configured to regenerate TMDS-based signals on one or more serial data links, according to some embodiments of the invention.

FIG. 7 illustrates a TMDS-based repeater configured to regenerate TMDS-based signals on one or more serial data links, according to some embodiments. A TMDS-based repeater 700 is configured to accept TMDS-based signals from inbound serial data link 702, and is further configured to regenerate or replicate those signals for transmission on one or more outbound TMDS-compliant serial data links 704a and 704b. As shown, TMDS-based repeater 700 includes elements having equivalent structures and/or functions as those similarly referenced in FIG. 2. That is, bus transmitters ("bus TX") 220, output ports ("O/P") 221, input ports ("I/P") 231, and bus receivers ("bus RX") 240 can facilitate the communication of parallel TMDS-based signals over parallel TMDS-based buses 230a and 230b. Generally, parallel TMDS sinks ("P/TMDS Sink") 260 each have at least an equivalent structure and/or function as the one similarly named in FIG. 2. However, parallel TMDS source ("P/TMDS Source") 708 includes a deserializer 710 configured deserialize the TMDS-based signals from a serial format that complies with TMDS specifications. For example, deserializer 710 functions to deserialize the serially-encoded data and control signals from the TMDS channels of inbound serial data link 702 to form, for example, an "m"-bit word that constitutes data for a pixel.

Advantageously, parallel TMDS-based buses 230a and 230b enable TMDS-based repeater 700 to regenerate and/or replicate TMDS-based signals onto one or more TMDS-compliant serial data links, without implementing either clock regeneration or TMDS decoding and encoding operations as conventional techniques require. So by omitting clock regeneration circuits and functions as well as TMDS decoders and encoders, TMDS-based repeater 700 can conserve resources and reduce delays in regenerating and/or replicating TMDS-based signals. In some embodiments, TMDS-based repeater 700 is an HDMI repeater. In yet another embodiment, bus transmitters ("bus TX") 220 of HDMI repeater 700 do not transmit control bits CTL[1:0]. Rather, HDMI repeater 700 relies on parallel TMDS sinks ("P/TMDS Sink") 260 to recreate those bits for transmission over outbound TMDS-compliant serial data links 704a and 704b. Note that TMDS-based repeater 700 can receive any number of inbound serial data links 702, and also can have any number of outbound TMDS-compliant serial data links 704a and 704b.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the invention to any embodiment; rather features and aspects of some embodiments may readily be interchanged with other embodiments. For example, although the above descriptions of the various embodiments relate to a parallel HDMI bus, the discussion is applicable to all types of communications links, including Digital Visual Interface ("DVI") buses and other types of communications protocols for conveying HD video and/or MC audio. In specific embodiments, Low-Voltage Differential Signaling ("LVDS") signaling can be used with or in place of TMDS-based signaling. While the parallel HDMI bus is described in context of an HDMI transmitter, one having ordinarily skill should appreciate its applicability to any HDMI receiver or device (e.g., HDTV or computer monitor/display). Content projection such as HDCP can be used.

In some embodiments, a parallel communications link carries data and/or control signals encoded for transmission over a serial data link. In some embodiments, a parallel TMDS transmitter (or source) encodes and transmits signals over a parallel bus in a format that complies with a TMDS-based protocol, when serialized. According to various embodiments, the serial data link complies with TMDS-based signaling protocols, such as Digital Visual Interface ("DVI"), Unified Display Interface ("HDMI"), High-Definition Multimedia Interface ("HDMI"), and the like. In a specific embodiment, given certain constraints, a parallel HDMI bus has a minimum number of interconnections between a parallel HDMI bus transmitter and a parallel HDMI bus receiver that are practical.

In some embodiments, an apparatus transmits TMDS-based signals via a TMDS-compliant serial link. The apparatus includes input ports including parallel TMDS input ports configured to at least receive subsets of parallel TMDS-based data signals. It also includes a TMDS-based signal extractor configured to extract groups of bits from the subsets of parallel TMDS-based data signals to form extracted groups. Further, the apparatus includes a number of serializers each of which is configured to at least serialize one of the extracted groups to form a serialized group. The serialized group is transmitted via the TMDS-compliant serial link.

Further, in some embodiments, each of the number of serializers is a transition-minimized differential signaling ("TMDS") encoder-serializer. The input ports are configured further to receive parallel TMDS-based control signals. In some cases, the parallel TMDS-based control signals include a clock signal, a vertical synch signal ("VSYNCH"), a horizontal synch signal ("HSYNCH"), a display enable signal ("DE"), a control three signal ("CTL3"), a control two signal ("CTL2"), a control one signal ("CTL1"), and a control zero signal ("CTL0"). Note that the TMDS-compliant serial link further comprises one or more of the following: a Digital Visual Interface ("DVI")-compliant link, Unified Display Interface ("UDI")-compliant link, and an iTMDS-compliant link. In other cases, the TMDS-compliant serial link further comprises a High-Definition Multimedia Interface ("HDMI")-compliant link. As such, the input ports can be configured further to receive parallel HDMI control signals.

The parallel HDMI control signals need only a clock signal, a vertical synch signal ("VSYNCH"), a horizontal synch signal ("HSYNCH"), a display enable signal ("DE"), a control three signal ("CTL3") and a control two signal ("CTL2"). In some embodiments, the apparatus includes a signal router configured to route the parallel TMDS-based control signals from to the TMDS encoder-serializers. The apparatus can also include a display enable ("DE") input port for receiving a DE control signal, which controls the routing of control and data signals based on the state of the DE control signal. In a specific embodiment, a TMDS-based signal extractor is configured further to recreate a control one signal ("CTL1") and a control zero signal ("CTL0") to form recreated control signals, and to apply the recreated control signals to one or more TMDS encoder-serializers.

In some embodiments, a High-Definition Multimedia Interface ("HDMI")-compliant transmitter includes a parallel HDMI bus, an HDMI protocol formatter, a parallel HDMI bus transmitter, a parallel HDMI bus receiver, and a TMDS transmitter. In yet another embodiment, a repeater regenerates TMDS-encoded audio and video signal for transmission over one or more serial links. The repeater includes one or more inbound serial data links, one or more parallel TMDS sources, one or more parallel TMDS sinks, and one or more parallel TMDS-based buses for carrying the parallel TMDS-based signals from the one or more parallel TMDS sources to the one or more parallel TMDS sinks.

As used herein, the term "embodiment" refers to an implementation. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. Different references to "some embodiments" do not necessarily refer to the same "some embodiments."

If the specification states a component, feature, structure, or characteristic "may", "might", or "could" be included, that particular component, feature, structure, or characteristic is not required to be included. If the specification or claim refers to "a" structure, that does not mean there is only one of the structure. When it is said the element "A" is coupled to element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." Likewise, if it is said A is responsive to B that does not mean A is solely responsive to B.

The foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the invention; rather any specific embodiment can provide one or more of the advantages discussed above. It is intended that the following claims and their equivalents define the scope of the invention.

What is claimed is:

1. A device comprising:
 a parallel bus having a plurality of lanes;
 a parallel source to provide parallel groups of signals including groups of video signals representing pixels and groups of control signals to the parallel bus, wherein the parallel bus has a number of lanes that is fewer than a number of signals used to represent a pixel, the parallel source including:
  a signal divider to divide a video signal into a two or more subsets of signals, each subset including a number of bits that is no more than the number of bus lanes, the signal divider including a clock edge synchronizer to configurable to synchronize a plurality of subsets of signals in a clock cycle, the bits of each subset being synchronized to an edge of a clock signal, and
  a controller to direct routing of video signals and control signals onto the parallel bus; and
 a parallel sink to receive the parallel subsets of signals from the parallel bus, wherein the parallel sink includes:
  a signal extractor to reconstruct the groups of signals from the received subsets of signals, the signal extractor to separate at least a portion of the groups of signals into multiple channels,
  encoder and serializer circuits to encode and serialize the separated signals, the signal extractor being operable to re-time each group of signals such that the bits of each group of signals pass to the encoder and serializer circuits in the same clock cycle, and
  a controller to control the receipt and extraction of signals.

2. The device of claim 1, wherein the parallel source is a parallel transition minimized differential signaling (TMDS)-based source and the parallel groups of signals are TMDS signals.

3. The device of claim 1, wherein the parallel bus has twelve lanes and twenty-four signals are used to represent a pixel.

4. The device of claim 1, wherein the signal extractor is to separate the at least a portion of the groups of signals into three color groups: red, green, and blue.

5. The device of claim 1, wherein the parallel source is in a first chip and the parallel sink is in a second chip.

6. The device of claim 5, wherein the first chip includes video processing circuitry to provide the video signals to the parallel source, and the second chip is a physical layer (PHY) chip.

7. The device of claim 1, wherein the parallel source is a parallel video and audio source in which the group of signals include video, audio, and control signals, and the parallel sink is a parallel video and audio sink.

8. The device of claim 7, wherein the parallel source includes a signal formatter to format the video, audio, and control signals in a High-Definition Multimedia Interface (HDMI) compatible format, and a transmitter to transmit the video, audio, and control signals on the parallel bus.

9. The device of claim 1, wherein the device includes a DVD player.

10. The device of claim 1, wherein the signal extractor is to recreate at least one control signal that can be inferred from transmitted control signals.

11. A system comprising:
 a serial link in a cable;
 a system video and audio sink device;
 a system video and audio source device coupled to the system video and audio sink device through a parallel bus, the system video and audio source device including:
  a parallel source to provide parallel groups of signals including video signals and control signals to the parallel bus, wherein the parallel bus has a number of lanes that is fewer than a number of signals used to represent a pixel, the parallel source including:
   a signal divider to divide a video signal into a two or more subsets of signals, each subset including a number of bits that is no more than the number of bus lanes, the signal divider including a clock edge synchronizer to configurable to synchronize a plurality of subsets of signals in a clock cycle, the bits of each subset being synchronized to an edge of a clock signal, and
   a controller to direct routing of video signals and control signals onto the parallel bus; and
  a parallel sink to receive the parallel subsets of signals from the parallel bus, wherein the parallel sink includes:
   a signal extractor to reconstruct the groups of signals from the received subsets of signals, the signal extractor to separate at least a portion of the groups of signals into multiple channels,
   encoder and serializer circuits to encode and serialize the separated signals, the signal extractor being operable to re-time each group of signals such that the bits of each group of signals pass to the encoder and serializer circuits in the same clock cycle, and
   a controller to control the receipt and extraction of signals.

12. The system of claim 11, wherein the parallel source is a parallel transition minimized differential signaling (TMDS)-based source and the parallel groups of signals are TMDS signals.

13. The system of claim 11, wherein the parallel source is in a first chip and the parallel sink is in a second chip, wherein the parallel source is a parallel video and audio source in which the group of signals include video, audio, and control signals, and the parallel sink is a parallel video and audio sink, and wherein the first chip includes video processing circuitry to provide the video signals to the parallel video and audio source.

14. The system of claim 11, wherein the parallel source is a parallel video and audio source in which the group of signals include video, audio, and control signals, and the parallel sink is a parallel video and audio sink, and wherein the parallel source includes a signal formatter to format the video, audio, and control signals in a High-Definition Multimedia Interface (HDMI) compatible format, and a transmitter to transmit the video, audio, and control signals on the parallel bus.

15. The system of claim 11, wherein the system video and audio sink device is a high definition display, and the system video and audio source device is one of the following: a DVD player, a set top box, and a computer.

16. A repeater for regenerating encoded signals for transmission over one or more serial links, the repeater comprising:
 one or more inbound serial data links;
 one or more parallel sources configured to encoded signals from said one or more inbound serial data links, and further configured to generate parallel encoded signals, each parallel source including:
  a signal divider to divide a video signal into a two or more subsets of signals, each subset including a number of bits that is no more than a number of bus lanes of a parallel bus, the signal divider including a clock edge synchronizer to configurable to synchronize a plurality of subsets of signals in a clock cycle, the bits of each subset being synchronized to an edge of a clock signal, and a controller to direct routing of video signals and control signals onto the parallel bus; and one or more parallel sinks configured to extract groups of bits from said parallel TMDS-based signals, and further configured to serialized said groups of bits for transmission over said one or more serial links, each parallel sink including:

a signal extractor to reconstruct the groups of signals from the received subsets of signals, the signal extractor to separate at least a portion of the groups of signals into multiple channels, encoder and serializer circuits to encode and serialize the separated signals, the signal extractor being operable to re-time each group of signals such that the bits of each group of signals pass to the encoder and serializer circuits in the same clock cycle, and a controller to control the receipt and extraction of signals; and one or more parallel buses for carrying said parallel encoded signals from said one or more parallel sources to said one or more parallel sinks, each of the parallel buses having a number of lanes that is fewer than a number of signals used to represent a pixel.

17. The repeater of claim 16, wherein said parallel encoded signals are transition-minimized differential signaling ("TMDS") signals.

18. The repeater of claim 16, wherein said repeater is a High-Definition Multimedia Interface ("HDMI") repeater and said one or more parallel TMDS-based buses are parallel HDMI buses.

* * * * *